United States Patent Office
3,449,128
Patented June 10, 1969

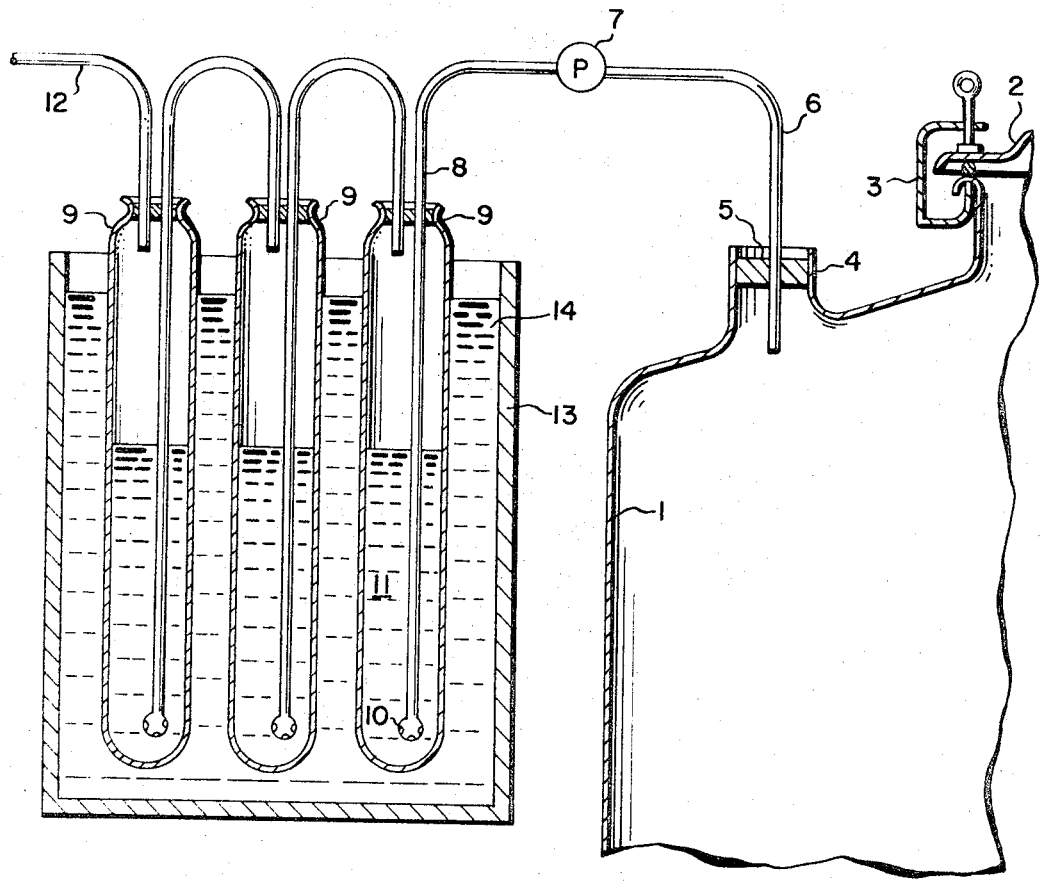

3,449,128
METHOD OF ENHANCING THE FLAVOR OF ALCOHOLIC BEVERAGES
Masakazu Yamada, Hayashi Komota, and Fumiyoshi Mano, all of Tokyo University of Agriculture, Tokyo, Japan
Filed Jan. 27, 1966, Ser. No. 523,444
Claims priority, application Japan, Feb. 5, 1965, 40/5,965; Apr. 15, 1965, 40/21,871
Int. Cl. C12c
U.S. Cl. 99—31                              5 Claims

ABSTRACT OF THE DISCLOSURE

The gas mainly consisting of carbon dioxide produced by fermenting whiskey, beer, or sake mash is passed through ethanol to strip the gas of soluble constituents. The solution so formed is added in small amounts to the beverage conventionally produced from the mash to enhance the flavor of the beverage.

This invention relates to a method of enhancing the flavor of alcoholic beverages, and particularly to a method of recovering flavor values from the gases emitted from mash during fermentation to alcohol.

The quality of a fermented beverage is generally determined by its color and other appearance factors, by its taste, and by its odor. This invention is mainly concerned with the odor or flavor of alcoholic beverages. The characteristic odors of the various beverages are generally ascribed to the presence of higher alcohols and their esters which are produced from carbohydrates and other materials present in the mash during fermentation. The flavoring components are lost to a greater or smaller extent during fermentation and in later processing steps, such as filtration, decolorizing or pasteurization.

We have found that the higher alcohols and their esters do not adequately account for the flavor of such beverages as whiskey, and that other materials, heretofore undetected, must be present to provide the full flavor. We have analyzed whiskey using the latest analytical techniques, and have compounded artificial whiskey by mixing the several components detected by analysis in the proportions in which they had been found. The product obtained was inferior to the beverage made by conventional methods.

While we have not yet been able to ascertain the nature of the missing substance, we have been able to collect it and to enhance the flavor of conventionally produced whiskey by adding the unknown flavoring material.

More specifically, we have found that flavor values are lost during fermentation of mash in the normal production of beer, sake, whiskey, and similar alcoholic beverages with the gas generated by the fermentation and mainly consisting of carbon dioxide, and that they may be recovered by contacting the gas with liquid solvents by which the flavor values are extracted from the gas. Suitable solvents include water and the lower saturated monohydric and polyhydric alcohols. The solvents are preferably harmless to humans in small amounts so that the solutions of flavoring material obtained may be directly added to beverages intended for human consumption. Typical physiologically tolerated alcohols used in our method thus are ethanol, propylene glycol and glycerin. The solvent is preferably held at a low temperature to reduce its evaporation in the fermentation gas during extraction.

Apparatus which has been used successfully in carrying out our method is illustrated in the attached drawing the sole figure of which shows the apparatus in fragmentary elevational section.

Referring to the drawing in detail, a fermentation vat 1 is only partly shown. Its top is covered by a gas-tight cover 2 which is flanged to the vat 1 by clamps 3 of which only one is visible in the drawing. A side tube 4 of the vat is closed by a plug 5 into which the intake tube 6 of a pump 7 is sealed. The pump discharges into the inlet pipe 8 of the first one of three gas washing bottles 9 arranged in series.

The free lower end 10 of the inlet pipe 8 is enlarged and formed with multiple perforations for distributing a gas in a solvent 11 which fills each bottle 9 to about one-half of its height. The outlet pipe 12 of the last bottle 9 is open to the atmosphere.

The bottles 9 are secured in a non-illustrated manner in a tank 13 and are almost completely immersed in a liquid refrigerant 14 which fills the tank.

The following examples illustrate the method of our invention as carried out in equipment of the type illustrated and described, but it will be understood that the invention is not limited to the examples, nor does it have to be performed in equipment similar to that shown. Many other conventional devices for contacting gases and liquids may be substituted for the gas washing bottles.

EXAMPLE 1

5000 liters of a mash mainly made of rice in the manner conventional in the brewing of sake, were placed in an internally enameled steel tank having a capacity of 9,000 liters, and equipped with heating and cooling coils and automatic temperature controls in the usual manner. The tank had a gas-tight cover and was equipped with a gas discharge tube having an orifice near the tank top. The mash was inoculated with yeast.

The gas discharge tube was connected to a battery of three gas washing bottles arranged in series, each bottle containing 3 liters 80% ethanol of Sp. Gr. 0.865, the last bottle being open to the atmosphere. The bottles were almost completely immersed in brine which was kept at a temperature between 0° C. and 5° C. by mechanical refrigeration while the mash in the tank was fermented.

The bottles were disconnected from the fermentation tank after 48 hours, and their contents were measured and analyzed. The results are listed in Table 1.

TABLE 1

|  | Bottle | | |
| --- | --- | --- | --- |
|  | No. 1 | No. 2 | No. 3 |
| Volume, liters | 2.41 | 2.8 | 2.4 |
| Ethanol, percent | 67.0 | 78.0 | 79.5 |
| Color | (1) | (1) | (1) |
| Specific gravity | 0.893 | 0.867 | 0.866 |
| n-Propanol, p.p.m. | 50 | 11 | Trace |
| i-Butanol, p.p.m. | 553 | 61 | Trace |
| act-Amyl alcohol, p.p.m. | 641 | 28 | Trace |
| i-Amyl alcohol, p.p.m. | 1,409 | 62 | 1 |
| Acetaldehyde | Trace | Trace |  |
| Ethyl acetate | Much | Much | Much |
| Ethyl propionate | Trace | Trace | Trace |
| n-Propyl acetate | Trace | Trace | Trace |
| i-Butyl acetate, p.p.m. | 90 | 85 | 12 |
| Ethyl n-butyrate, p.p.m. | 70 | 47 | 6 |
| i-Amyl acetate, p.p.m. | 2,205 | 680 | 64 |
| Ethyl n-caproate, p.p.m. | 215 | 43 | 5 |
| Ethyl n-caprylate, p.p.m. | 99 | 12 | Trace |
| Ethyl lactate | Trace | Trace |  |
| Ethyl n-caprate, p.p.m. | 18 | Trace | Trace |
| Ethyl n-laurate, p.p.m. | 0.6 | Trace | Trace |
| Phenylethyl acetate, p.p.m. | 8 | Trace | Trace |
| β-Phenylethyl alcohol, p.p.m. | 2 | Trace | Trace |

[1] Transparent.

The three batches of alcoholic extract were combined and added to 10,000 liters of commercial sake ready for bottling. The flavor of the beverage was greatly enhanced by the addition, and competent tasters expressed preference for the enhanced taste.

Although the added alcoholic solution amounted to less than 0.1% of the improved sake, and consisted mainly of water and alcohol, the difference was clearly apparent even to a layman. Significant improvement could be achieved with even smaller amounts of added extract, such as one part in 2000.

The bottled sake, when stored with the usual precautions maintained its improved flavor.

EXAMPLE 2

5,000 liters of a mash prepared mainly from barley in the manner conventional in whiskey making was placed in a 10,000 liter enameled steel tank and a battery of three gas washing bottles, each containing three liters 70% ethanol, of Sp. Gr. 0.891, was connected to the otherwise sealed tank.

The bottle were discontinued from the tank after 36 hours, and their contents were combined, measured, and analyzed. The results are listed in Table 2. A synthetic addition agent was blended from water, ethanol, and the flavoring constituents found by analysis. This synthetic mixture did not improve the flavor of conventional whiskey as much as did the contents of the gas washing bottles. It must be assumed that the fermentation gas carried with it a component soluble in ethanol, but effective in amounts too small to be detected by gas chromatography.

Table 2

| | |
|---|---|
| Volume, liters | 8.4 |
| Ethanol, percent | 58.8 |
| Color | Colorless |
| Specific gravity | 0.919 |
| Odor | Typical of whiskey |
| Fusel oil, percent | 0.125 |
| Total ester (as ethyl acetate) percent | 0.244 |
| Total aldehyde (as acetaldehyde) percent | 0.013 |
| n-Propanol p.p.m. | 26 |
| i-Butanol p.p.m. | 245 |
| act-Amyl alcohol p.p.m. | 268 |
| i-Amyl alcohol p.p.m. | 602 |
| β-Phenylethyl alcohol p.p.m. | 0.8 |
| Acetaldehyde | Trace |
| Ethyl acetates | Much |
| n-Propyl acetate | Trace |
| i-Butyl acetate p.p.m. | 7 |
| i-Amyl acetate p.p.m. | 18 |
| Phenylethyl acetate p.p.m. | 2 |
| Ethyl lactate | Trace |
| Ethyl-n-butyrate p.p.m. | 6.5 |
| Ethyl-n-caproate p.p.m. | 7.1 |
| Ethyl-n-caprylate p.p.m. | 5.5 |
| Ethyl-n-caprate p.p.m. | 1.2 |
| Ethyl-n-laurate p.p.m. | 1.6 |

The extract obtained by stripping the fermentation gas was added to a mixture of 6,000 liters 40% ethanol and 4,000 liters malt whiskey, four years old. The product obtained had a flavor greatly superior to the mixture of alcohol and whiskey without the addition of the flavoring extract. Stronger flavor was obtained by the use of one part of extract for 500 parts of the alcohol-whiskey mixture, but was considered somewhat too strong by the tasters.

EXAMPLE 3

A mash of malt, hops and other ingredients conventionally employed in the brewing of beer was fermented in the manner described in Example 1, each of the gas washing bottles being originally provided with three liters 92 percent alcohol having a specific gravity of 0.827.

The three batches of alcoholic solutions were combined, measured, and analyzed as described before. The results are listed in Table 3.

Table 3

| | |
|---|---|
| Volume, liters | 8.1 |
| Ethanol, percent | 81.3 |
| Color | Colorless |
| Specific gravity | 0.859 |
| Odor | Like beer |
| Fusel oil, percent | 0.138 |
| Total ester (as ethyl acetate) percent | 0.166 |
| Total aldehyde (as acetaldehyde) percent | 0.160 |
| n-Propanol p.p.m. | 26 |
| i-Butanol p.p.m. | 310 |
| act-Amyl alcohol p.p.m. | 220 |
| i-Amyl alcohol p.p.m. | 730 |
| β-Phenylethyl alcohol p.p.m. | 0.2 |
| Acetaldehyde | Trace |
| Ethyl acetate | Much |
| n-Propyl acetate p.p.m. | 1.3 |
| i-Butyl acetate p.p.m. | 35 |
| i-Amyl acetate p.p.m. | 525 |
| Phenylethyl acetate | Trace |
| Ethyl n-butyrate p.p.m. | 14 |
| Ethyl n-caprylate p.p.m. | 109 |
| Ethyl n-caprate p.p.m. | 78 |
| Ethyl n-laurate p.p.m. | 8.5 |
| Ethyl n-lactate p.p.m. | 2.1 |

When added to draft beer at the rate of one liter per 10,000 liters, the flavoring extract of the invention greatly improved improved and enhanced the flavor of the beer. Significant improvement was achieved even with one liter of extract added to 20,000 liters of beer.

When water was substituted for ethanol as a washing liquid for the fermentation gas, the flavoring solutions obtained were substantially weaker than the ethanol extracts but still quite effective when used in adequate amounts. The glycols and glycerin appeared to be as effective as ethanol in recovering the desired flavor values from the fermentation gas, but their sweet and partly acrid taste was superimposed on that of the sake, beer or whiskey ultimately produced, and was noticeable to experienced tasters even in the small quantities necessary. The di- and polyhydric alcohols were acceptable to less experienced tasters.

The method of the invention is highly beneficial in enhancing the natural taste of alcoholic beverages by means of flavoring constituents extracted from the fermentation gas of a mash of carbohydrates and other materials ultimately intended for the production of the same type of beverage, but the invention is not necessarily limited to mixtures of the same general origin. If so desired, the flavor of one beverage may be imparted to another beverage or to a liquid not having any significant flavor of its own.

The flavoring extract of the invention may be added to a large amount of a beverage at any stage of the manufacture of the latter although the benefits of the invention are partly lost unless necessary care is taken in further processing steps. Preferably, no other operations but blending and bottling are performed after addition of the flavoring extract.

While the invention has been described with particular reference to specific embodiments, it is to be understood that it is not limited thereto, but is to be construed broadly and restricted solely by the scope of the appended claims.

What is claimed is:

1. A method of enhancing the flavor of an alcoholic beverage which comprises:
   (a) fermenting a mash selected from the group consisting of sake mash, whiskey mash, and beer mash containing carbohydrates to convert said carbohyrates to alcohol and carbon dioxide, whereby a feremtation gas mainly consisting of carbon dioxide is released from said mash;
   (b) contacting said gas with a liquid solvent until soluble constituents of said gas are separated from the carbon dioxide, and a solution of said constituents in said solvent is formed; and (c) mixing said solution with the alcoholic beverage.

2. A method as set forth in claim 1, wherein said solvent is water or a lower physiologically tolerated alcohol having a saturated carbon chain.

3. A method as set forth in claim 2, wherein said solvent is ethanol.

4. A method as set forth in claim 1, wherein said solution is mixed with said beverage in a ratio of one part of the solution to approximately 20,000 to 500 parts of the beverage.

5. A method as set forth in claim 1, wherein said beverage is sake when said mash is sake mash, beer when said mash is beer mash, and whiskey when said mash is whiskey mash.

References Cited

UNITED STATES PATENTS 2,103,449  12/1937  Grutchfield et al. ____ 99—34 X
2,536,994  1/1951  Gremaschi _____ 99—35

OTHER REFERENCES

Hind H. L.: Breming Science and Practice Chapman & Hall, London, 1950 (pages 839 and 840) (copy 172).

A. LOUIS MONACELL, *Primary Examiner.*

D. M. NAFF, *Assistant Examiner.*

U.S. Cl. X.R.

99—34, 35, 140